United States Patent [19]

Mitsuhashi

[11] Patent Number: 4,881,129
[45] Date of Patent: Nov. 14, 1989

[54] FACSIMILE INTERFACE DEVICE FOR LAND-MOBILE TELEPHONES

[75] Inventor: Yasuhiro Mitsuhashi, Yokohama, Japan

[73] Assignee: Keihin Co., Ltd., Yokohama, Japan

[21] Appl. No.: 239,743

[22] Filed: Sep. 2, 1988

[30] Foreign Application Priority Data

Mar. 31, 1988 [JP] Japan .............................. 63-43990[U]

[51] Int. Cl.$^4$ .............................................. H04B 1/46
[52] U.S. Cl. .................................. 358/434; 455/258; 358/89; 379/100
[58] Field of Search ................... 379/100; 455/89, 142, 455/78; 358/257, 258, 256; 370/76, 24, 29, 30

[56] References Cited

U.S. PATENT DOCUMENTS 4,639,553 1/1987 Kiguchi ................................ 379/100
4,663,778 5/1987 Takahashi ........................... 379/100

FOREIGN PATENT DOCUMENTS 60-64564 4/1983 Japan ................................... 379/100

Primary Examiner—Benedict V. Safourek
Assistant Examiner—Tesfaldet Bocure
Attorney, Agent, or Firm—Wenderoth, Lind & Ponack

[57] ABSTRACT

A facsimile interface device for a land-mobile telephone system includes a changeover circuit for connecting and disconnecting a facsimile device with a land-mobile telephone circuit, and a matching circuit for electrically matching the facsimile device to the telephone circuit. The interface device further includes a control circuit for determining based on the position of a mode select switch whether a signal received is for the telephone circuit or the facsimile device, and for controlling the changeover circuit accordingly.

12 Claims, 2 Drawing Sheets

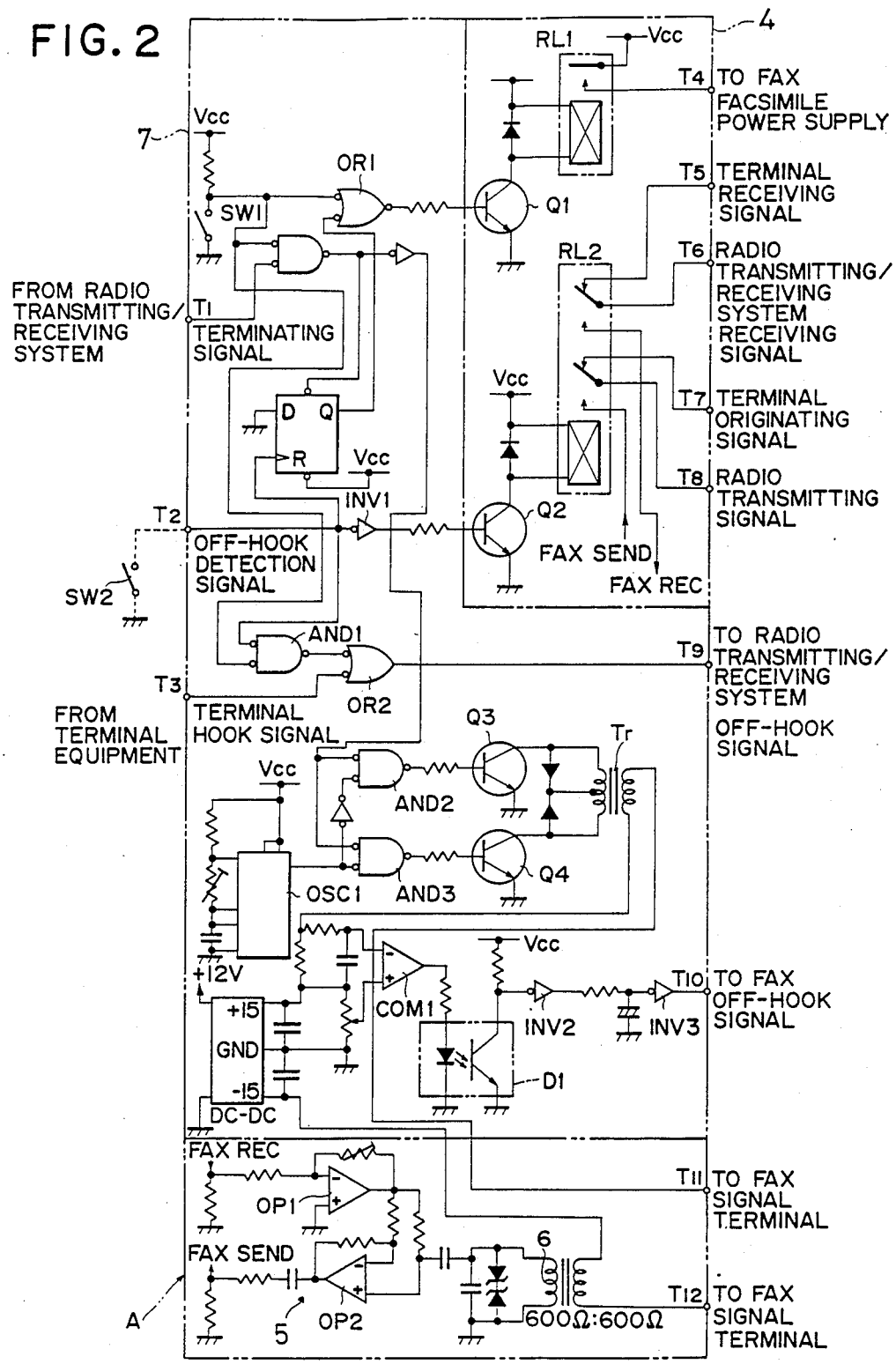

FACSIMILE INTERFACE DEVICE FOR LAND-MOBILE TELEPHONES

BACKGROUND OF THE INVENTION

1. Field of the Invention

The present invention relates to a facsimile interface device for land-mobile telephones and, more particularly, to a device for connecting a facsimile device with a land-mobile telephone circuit.

2. Related Art

Various types of land-mobile telephone sets are used as a mobile telephone, in which a telephones set installed in a motor vehicle is connected to a public telephone circuit through a radio circuit when communication is desired.

With the diversification and advancement of data communications and the complexity of human social activity, there is an increasing demand for the installation of a facsimile device in a motor vehicle as an image data communication means, in addition to the conventional mobile telephone set used as a sound data communication means.

SUMMARY OF THE INVENTION

It is accordingly an object of the present invention to provide a facsimile interface device for land-mobile telephones having a simple construction and capable of connecting a facsimile device with a land-mobile telephone circuit.

Another object of the present invention is to provide a facsimile interface device for land-mobile telephones which enables connection of a facsimile device with an existing land-mobile telephone set without substantial modification of the existing land-mobile telephone set.

To achieve the foregoing objects, there is provided according to the present invention a facsimile interface device for a land-mobile telephone system, comprising:

a changeover circuit for connecting one of a telephone set of the land-mobile telephone system and a facsimile device with a radio transmitting/receiving machine of the land-mobile telephone system in accordance with a changeover signal; and a matching circuit disposed between the changeover circuit and the facsimile device for matching the radio transmitting/receiving machine to the facsimile device.

With the facsimile interface device thus constructed, the changeover circuit is operated upon receipt of the changeover signal to selectively connect the telephone set of the land-mobile telephone system and the facsimile device with the radio transmitting/receiving machine. The radio transmitting/receiving machine and the facsimile device are electrically matched to one another by the matching circuit, thus enabling facsimile communication using an existing land-mobile telephone circuit.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2 is a circuit diagram of the facsimile interface device.

DETAILED DESCRIPTION

Figure 1:
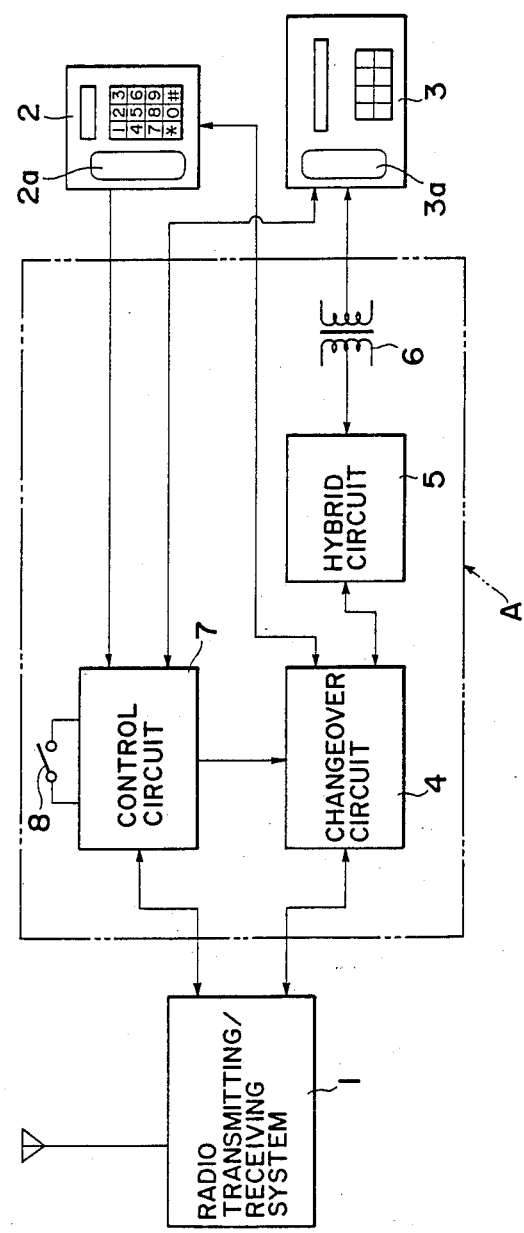
FIG. 1 is a block diagram showing a facsimile interface device for land-mobile telephones according to the present invention.

A preferred embodiment of the present invention will be described hereinbelow in detail with reference to the accompanying drawings.

As shown in FIG. 1, a land-mobile telephone system includes a radio transmitting/receiving system or machine 1 (hereinafter referred to as "radio machine") and a telephone set 2 both connected by cables to a facsimile interface device A (hereinafter referred to as "facsimile device") embodying the present invention. The radio machine 1 and the telephone set 2 are conventional in construction and function.

A facsimile device 3 is also connected by cables to the interface device A. The facsimile device 3 may be of a standard functional type and does not need any structurally and operationally optional component.

The interface device A thus connected with the radio machine 1, the telephone set 2 and the facsimile device 3 serves to selectively connect the telephone set 2 and the facsimile device 3 with the radio machine 1 and to perform electrical matching between the radio machine 1 and the facsimile device 3. To this end, the interface device A is composed of a changeover circuit 4, a hybrid circuit 5, matching transformer 6 and a control circuit 7.

The changeover circuit 4 operates to connect one of the telephone set 2 and the facsimile device 3 with the radio machine 1 in accordance with a changeover signal delivered from the control circuit 7 described later.

The hybrid circuit 5 serves to perform electric matching between the radio machine 1 and the facsimile device 3 in terms of not only impedance matching but also voltage matching and current matching. The hybrid circuit 5 is connected with the facsimile device 3 via the matching transformer 6.

The main operation of the control circuit 7 is operative mainly to produce a changeover signal for controlling the operation of the changeover circuit 4. To this end, the control circuit 7 includes a mode select switch 8. When the mode select switch 8 is closed, the control circuit 7 issues a predetermined changeover signal to the changeover circuit 4. Upon receipt of the changeover signal, the changeover circuit 4 establishes a communication link between the radio machine 1 and the facsimile device 3.

The control circuit 7 further operates to input a hook signal from the telephone set 2 to the radio machine 1 and also to produce per se a hook signal which in turn is inputted to the radio machine 1 and the facsimile device 3 at a predetermined level.

With the facsimile interface device A thus constructed, when the mode select switch 8 is open, the changeover circuit 4 connects the radio machine 1 and the telephone set 2 together. In this condition, the land-mobile telephone system is kept in an operative condition in which sound data communication (transmission/reception) can be achieved through the telephone set 2.

Then the mode select switch 8 is closed the changeover circuit 4 establishes communication between the radio machine 1 and the facsimile device. In this instance, if the facsimile device 3 is kept in the receiving mode, a facsimile transmitting signal which has been received at the radio machine 1 is inputted through the changeover circuit 4 to the hybrid circuit 5. After having been subjected to certain signal processing techniques such as signal level conversion, the facsimile transmitting signal is delivered through the matching transformer 6 to the facsimile device 3 which in turn reproduces the transmitted image signals into visible images in a known manner.

When the facsimile device 3 is kept in the transmitting mode, a facsimile transmitting signal is inputted to the radio machine 1 in a manner opposite that in the foregoing receiving mode. The radio machine 1 modulates the facsimile transmitting signal in a predetermined manner and then transmits the thus modulated signal into a radio circuit in the form of a modulated carrier wave.

FIG. 2 shows a circuit diagram of the interface device A shown in FIG. 1.

The control circuit 7 of the interface device A is constructed to receive the terminating signal from the radio machine 1 and the hook-signal from a terminal equipment and to output the control signal required for the operation of the changeover circuit 4, the radio machine 1 and the facsimile device 3. The control circuit 7 further has a function so called "switchboard station" of producing a predetermined alternate current signal required for the telephone circuit.

The control circuit 7 includes a automatic mode changeover switch SW1 for taking the facsimile device 3 into the automatic receiving mode when it is closed. Stated more specifically, when the changeover switch SW1 is closed, an OR gate OR1 issues an off signal to a transistor Q1 to make the latter non-conductive, thereby de-energizing the relay RL1 for interrupting power supply to the facsimile device 3. Either when the terminating signal (identification signal indicative of transmission of the facsimile signal through the radio circuit to the radio machine 1) is delivered from the radio machine 1 to a terminal T1, or when an off-hook detection signal is supplied to a terminal T2, the OR gate OR1 sends a signal to the transistor Q1 of the changeover circuit 4 to thereby make the latter conductive. Upon conduction of the transistor Q1, the relay RL1 is energized, thereby connecting the facsimile device 3 with the power supply through a terminal T3.

The terminal T2 is adapted to be connected with an external switch SW2 which produces an off-hook signal to place the facsimile device 3 into the receiving mode. Thus, when the switch SW2 is closed, the facsimile device 3 is automatically placed in the receiving mode without picking-up a handset 3a of the facsimile device 3. The off-hook signal produced from the switch SW2 is supplied through an inverter gate INV1 to a transistor Q2 of the changeover circuit 4 for controlling operation of relay RL2 as described later on.

Upon arrival of the terminating signal and the off-hook signal, respectively, at the terminals T1 and T2, the control circuit 7 delivers a hook signal through an AND gate AND1 and an OR gate OR2 to a terminal T9 connected to the radio machine 1.

The terminal T3 receives a hook signal from the telephone set 2 when a handset 2a of the telephone set 2 is picked up.

The "terminal equipment" shown in FIG. 2 practically means the telephone set 2.

The control circuit 7 includes a part which serves as a switchboard station. This part is composed of an IC for transmission formed of an oscillator OSC1, two AND gates AND2, AND3, two transistors Q3, Q4, a transformer Tr, etc. In this switchboard station part, the oscillator OSC1 produces a rectangular wave signal of a predetermined frequency (e.g. 16 Hz) in synchronism with the terminating signal (inputted to the terminal T1) from the radio machine 1, and the rectangular wave signal thus produced is converted by the transformer Tr into a substantially sinusoidal alternate current signal, thus producing an alternate currect signal required for the telephone circuit. The thus-produced alternate currect signal is supplied to one side of the matching transformer 6 which is connected to the output of the hybrid circuit 5 (which is connected to terminals T11 and T12) where the alternate currect signal and the facsimile signal are superposed with each other as described later on.

The transformer Tr is connected at its secondary side to a comparator COM1, a photo-diode D1 and two inverter gates INV2, INV3, etc. which are combined in series for producing an off-hook detection signal to be inputted to the facsimile device 3. The off-hook detection signal thus produced is delivered to a terminal T10.

The changeover circuit 4 is mainly composed of the relays RL1, RL2 and the transistors Q1, Q2 for driving the relays RL1, RL2, respectively. The changeover circuit 4 thus constructed serves to changeover the connection of the signal lines and the control lines extending between the radio machine 1, the telephone set 2 and the facsimile device 3.

The relay RL1 of the changeover circuit 4 is used for connecting and disconnecting the power supply to the facsimile device 3. When the facsimile device 3 is not set in the automatic receiving mode in which the switch SW1 is closed, the facsimile device 3 is continuously connected with the power supply. On the other hand, the facsimile device 3, while being set in the automatic receiving mode, is connected with the power supply only when the facsimile signal is received.

The relay RL2 of the changeover circuit 4 serves to connect and disconnect signal lines between the radio machine 1, the telephone set 2 and the facsimile device 3. When the transistor Q2 is non-conductive, i.e. in the absence of the off-hook detection signal, signal lines between the radio machine 1 and the telephone set 2 are connected by the relay RL2. Thus, the land-mobile telephone system is active in this condition.

When the off-hook detection signal is inputted to the terminal T2, the transistor Q2 is turned on whereupon the relay RL2 is driven to changeover its contacts, thereby establishing signal lines between the radio machine 1 and the facsimile 3. The radio machine 1 is connected to the hybrid cricuit 5 through terminals T6 and T8.

The hybrid circuit 5 is formed of an amplifier circuit mainly composed of two operating amplifiers OP1, OP2 combined together for effecting the level adjustment of transmitting/receiving signals, the impedance matching of the transmitting/receiving signals and other signal processings. The hybrid circuit 5 and the facsimile device 3 are connected together with the matching transformer 6 disposed therebetween. The matching transformer 6 performs the impedance matching with respect to the facsimile device 3. One side of the matching transformer 6 adapted to be connected to the terminals T11, T12 is connected with the switchboard station part of the control circuit 7 for superposing the desired alternate current signal with the facsimile signal. When the facsimile device 3 is set in the receiving mode, the receiving signal after having passed through the changeover circuit 4 is inputted from the radio machine 1 through the operation amplifier OP1 and the matching transformer 6 to the facsimile device 3. Alternatively, when the facsimile device 3 is operating in the transmitting mode, the transmitting signal delivered from the facsimile device 3 flows through the matching transformer 6 and the operation amplifier OP2 and then is inputted through the changeover circuit 4 to the radio machine 1.

Obviously, various modifications and variations of the present invention are possible in the light of the above teaching. It is therefore to be understood that within the scope of the appended claims the invention may be practiced otherwise than as specifically described.

What is claimed is:

1. An interface device for connection to a radio transmitter/receiver, a telephone set, and a facsimile device, said interface device comprising:
    a mode select means for selecting an operational mode of said interface device;
    a changeover means for selectively connecting one of the telephone set and the facsimile device to the radio transmitter/receiver in accordance with a changeover signal supplied thereto;
    a matching means connected to said changeover means for electrically matching the radio transmitter/receiver with the facsimile device;
    a control means connected to said changeover means for determining based on said operational mode whether a signal received from said radio transmitter/receiver is to be transmitted to said telephone set or said facsimile device, and for outputting said changeover signal to said changeover means in accordance with the determination as to whether a signal received from said radio transmitter/receiver is to be transmitted to said telephone set or said facsimile device, and for setting said facsimile device into an automatic receiving mode.

2. An interface device as claimed in claim 1, wherein said control means further comprises a means for supplying power to said facsimile device when said facsimile device is in said automatic receiving mode and a signal is being transmitted from said radio transmitter/receiver to said facsimile device.

3. An interface device as claimed in claim 1, wherein said control means further includes a means for sending a off-hook signal to said radio transmitter/receiver in response to a detected off-hook signal from said telephone set.

4. An interface device as claimed in claim 2, wherein said control means further includes a means for sending a hook signal to said radio transmitter/receiver in response to a detected hook signal from said telephone set.

5. An interface device as claimed in claim 1, wherein said matching means comprises a hybrid circuit which is connected to said changeover circuit and a matching transformer which is connected between said hybrid circuit and said facsimile device.

6. An interface device as claimed in claim 2, wherein said matching means comprises a hybrid circuit which is connected to said changeover circuit and a matching transformer which is connected between said hybrid circuit and said facsimile device.

7. An interface device as claimed in claim 3, wherein said matching means comprises a hybrid circuit which is connected to said changeover circuit and a matching transformer which is connected between said hybrid circuit and said facsimile device.

8. An interface device as claimed in claim 4, wherein said matching means comprises a hybrid circuit which is connected to said changeover circuit and a matching transformer which is connected between said hybrid circuit and said facsimile device.

9. An interface device as claimed in claim 5, wherein said control means further includes a means for generating an alternating signal to be supplied to said matching transformer via said changeover circuit, wherein said matching transformer superposes said alternating signal with a facsimile signal received from said radio transmitter/receiver.

10. An interface device as claimed in claim 6, wherein said control means further includes a means for generating an alternating signal to be supplied to said matching transformer via said changeover circuit, wherein said matching transformer superposes said alternating signal with a facsimile signal received from said radio transmitter/receiver.

11. An interface device as claimed in claim 7, wherein said control means further includes a means for generating an alternating signal to be supplied to said matching transformer via said changeover circuit, wherein said matching transformer superposes said alternating signal with a facsimile signal received from said radio transmitter/receiver.

12. An interface device as claimed in claim 8, wherein said control means further includes a means for generating an alternating signal to be supplied to said matching transformer via said changeover circuit, wherein said matching transformer superposes said alternating signal with a facsimile signal received from said radio transmitter/receiver.

* * * * *